United States Patent
Neef et al.

(10) Patent No.: US 9,101,864 B2
(45) Date of Patent: Aug. 11, 2015

(54) FILTER DEVICE HAVING AN ANNULAR FILTER ELEMENT

(71) Applicant: MANN+HUMMEL GMBH, Ludwigsburg (DE)

(72) Inventors: Pascal Neef, Renningen (DE); Robert Kusebauch, Landau a.d. Isar (DE); Friedrich Kupfer, Poxau (DE); Johannes Lampert, Woerthsee (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 49 days.

(21) Appl. No.: 14/012,415

(22) Filed: Aug. 28, 2013

(65) Prior Publication Data
US 2013/0340399 A1    Dec. 26, 2013

Related U.S. Application Data

(63) Continuation of application No. PCT/EP2012/051665, filed on Feb. 1, 2012.

(30) Foreign Application Priority Data

Feb. 28, 2011   (DE) .................. 10 2011 012 633

(51) Int. Cl.
*B01D 46/00* (2006.01)
*B01D 35/30* (2006.01)
*B01D 46/24* (2006.01)

(52) U.S. Cl.
CPC .............. *B01D 35/30* (2013.01); *B01D 35/306* (2013.01); *B01D 46/0004* (2013.01); *B01D 46/0005* (2013.01); *B01D 46/2403* (2013.01); *B01D 46/2411* (2013.01); *B01D 46/2414* (2013.01); *B01D 2201/301* (2013.01); *B01D 2265/02* (2013.01); *B01D 2265/05* (2013.01)

(58) Field of Classification Search
CPC .......... B01D 46/0004; B01D 46/2411; B01D 46/2414; B01D 35/306; B01D 2201/291; B01D 2201/301; B01D 2201/305; B01D 2201/306; B01D 2265/022; B01D 46/0005; B01D 2265/02; B01D 2265/021
USPC .................... 55/498, 503, 510; 210/451, 452
See application file for complete search history.

(56) References Cited

U.S. PATENT DOCUMENTS

| 5,688,396 A * | 11/1997 | Baumann et al. ............ 210/130 |
| 7,497,887 B2 * | 3/2009 | Baumann ..................... 55/385.3 |
| 2007/0227963 A1 * | 10/2007 | Fick et al. .................. 210/433.1 |

FOREIGN PATENT DOCUMENTS

| DE | 19737699 A1 | 3/1999 | | |
| EP | 0423435 A1 * | 4/1991 | ........... | F02M 35/024 |
| EP | 748646 A2 * | 12/1996 | ............ | B01D 35/30 |
| EP | 0882483 A2 | 12/1998 | | |
| EP | 1008375 A1 * | 6/2000 | ............ | B01D 29/15 |
| WO | WO 2004007052 A1 * | 1/2004 | ............ | B01D 35/31 |

* cited by examiner

*Primary Examiner* — Robert Clemente
(74) *Attorney, Agent, or Firm* — James Hasselbeck

(57) ABSTRACT

A filter device includes a lid (6) configured for detachable mounting to a filter housing, an annular filter element (2) mounted to the lid (6), a closure part (13) embodied as a separate component from the filter element and the lid (6) with the closure part (13) detachably secured to at least one of the lid (6) and the filter element (2).

14 Claims, 12 Drawing Sheets

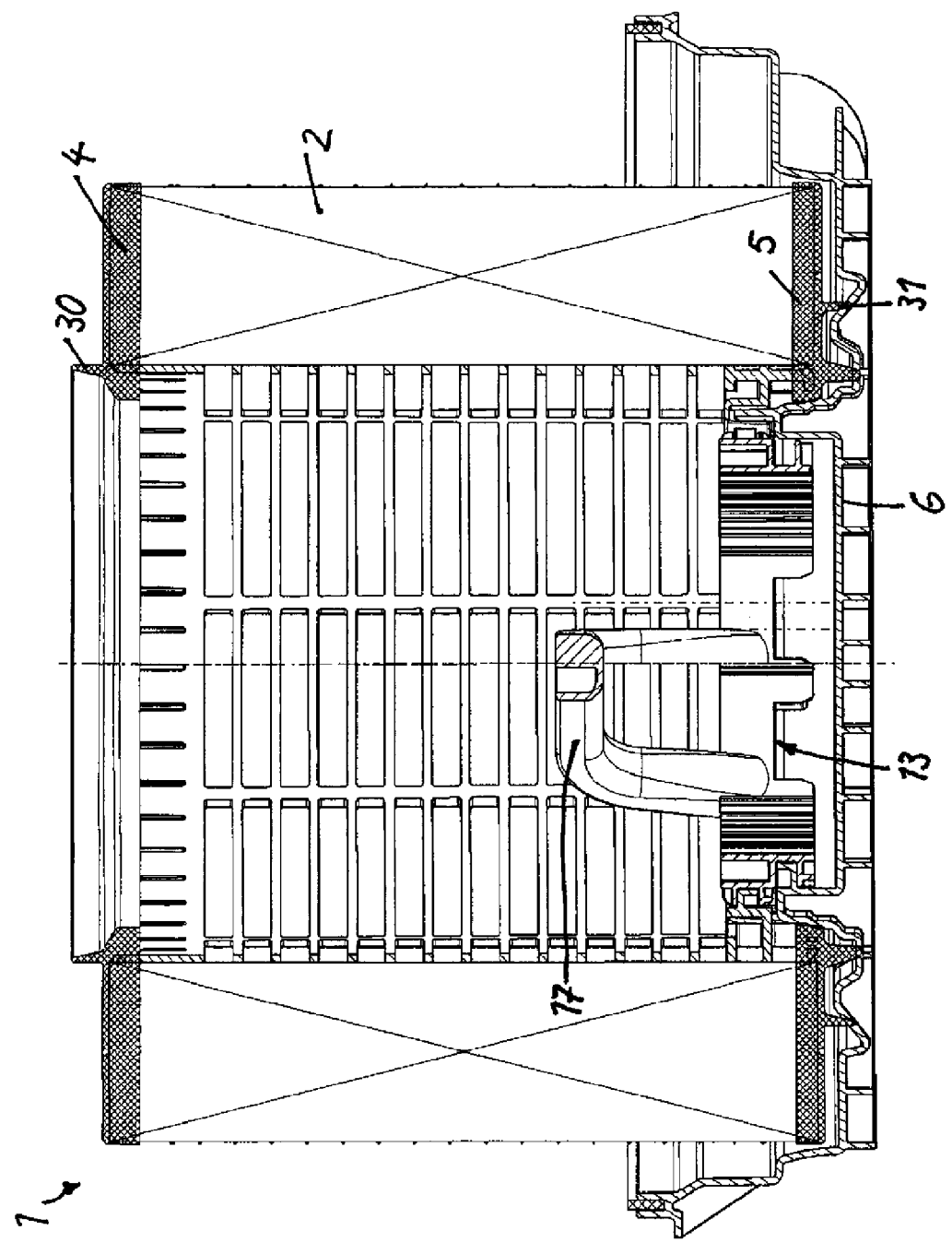

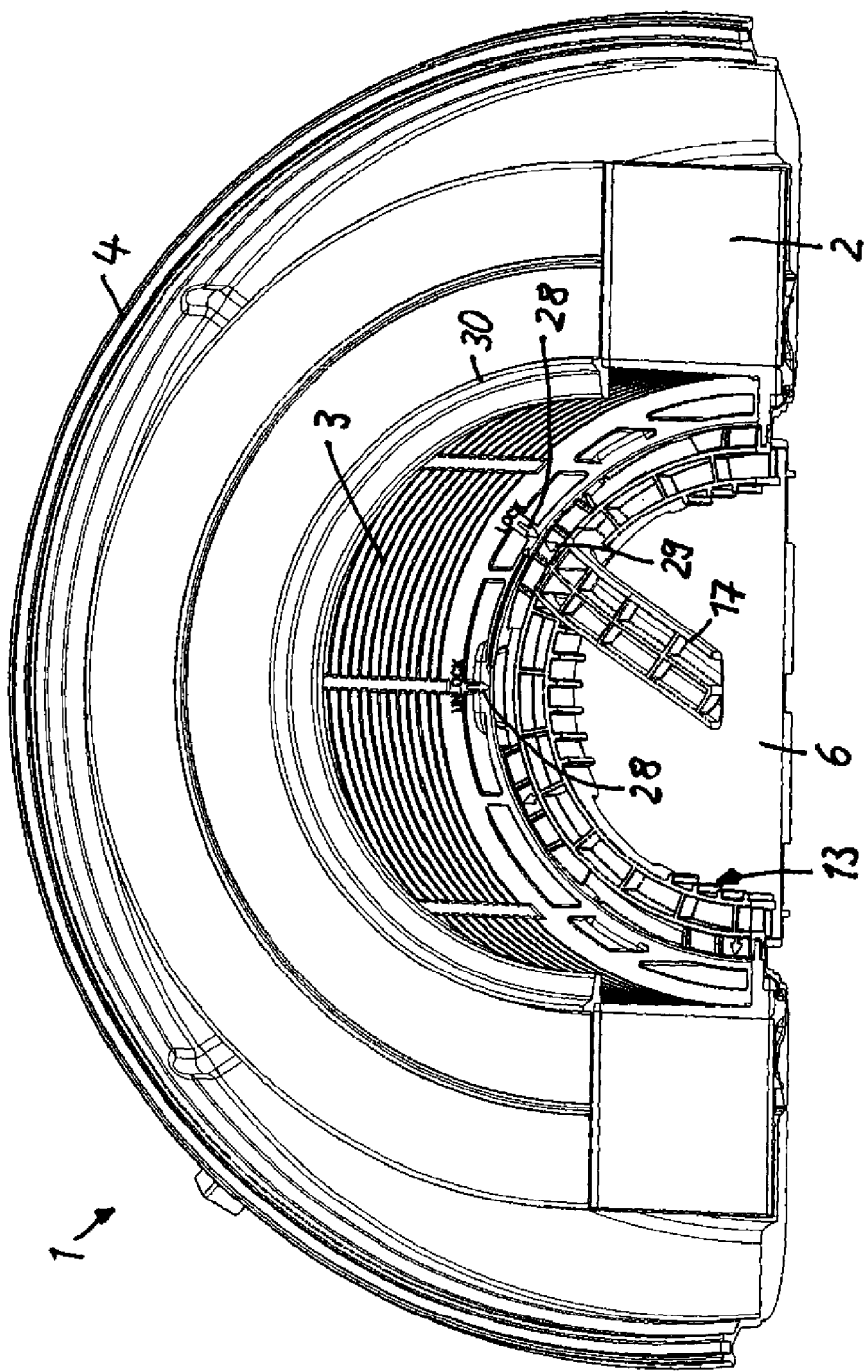

FILTER DEVICE HAVING AN ANNULAR FILTER ELEMENT

CROSS REFERENCE TO RELATED APPLICATIONS

This application is a bypass continuation of international PCT application PCT/EP2012/051665 filed Feb. 1, 2012 and designating the United States of America. This application claims a priority date of Feb. 28, 2011, based on priority claimed in PCT/EP2012/051665 to prior filed German patent application No. 10 2011 012 633.3, the entire contents of the aforesaid international application and the German patent application being incorporated herein by reference.

TECHNICAL FIELD

The invention concerns a filter device having an annular filter element.

BACKGROUND

EP 0 882 483 A2 discloses a filter device with an annular filter element that is arranged in a cup-shaped filter housing that is to be closed by a lid. The annular filter element is flowed through in radial direction from the exterior to the interior, the purified fluid is subsequently axially discharged. A central tube as a support body is integrated into the filter element and forms the wall of the axial interior through which the purified fluid is discharged. The end faces of the filter element are covered by a terminal disk. In addition, on the central tube a sealing bottom is provided on the end face that is facing the lid and closes the axial interior. The sealing bottom is secured fixedly to the lid by a tie anchor.

Mounting and demounting is relatively complex as a result of the anchor which penetrates the filter element axially through the interior space and is attached to the oppositely positioned housing bottom.

The invention has the object to simplify mounting of a filter device or the exchange of the filter element with simple constructive measures while providing an inexpensive manufacture.

SUMMARY OF THE INVENTION

The filter device according to the invention—a gas filter or a liquid filter—has an annular or hollow-cylindrical filter element which is flowed through in radial direction by the fluid to be filtered. The preferred flow direction is radial from the exterior to the interior wherein the purified fluid is axially discharged via the interior in the filter element.

The filter element is received in a filter housing which is closed off by a lid. For assembly, the filter element is inserted into the housing and closed off by the lid wherein the lid is to be connected to the filter element.

In the embodiment according to the invention, a closure part is provided that is embodied as a separate component and that is to be connected with the lid as well as with the filter element and that forms the connecting element between the lid and the filter element. The closure part is independent and discrete from the lid and from the filter element or from a component connected to the filter element. Moreover, it is provided that the closure part is releasably configured at least with one of the components, preferably with both components (lid and/or filter element). As a result of the releasability, mounting as well as demounting or exchange of the filter element is simplified. The filter element and the lid do not form a mandatorily connected component unit that must be inserted into the filter housing or must be removed therefrom as a whole. Instead, it is now possible to first insert the filter element into the housing and subsequently connect it by means of the closure part to the lid.

For servicing purposes, it is sufficient to exchange the filter element and to keep the lid. In this way, a significant cost reduction is achieved.

According to an expedient embodiment, it is provided that the closure part is supported rotatably in the lid and/or in the filter element. The rotatable arrangement has the advantage that the rotational movement can be used as a locking movement. Inasmuch as the closure part is rotatable relative to both components, during the locking movement the filter element as well as the lid remain in their stationary position relative to the housing so that only the closure part is rotated. Accordingly, the locking forces are significantly reduced because no rotational movement of the lid and/or of the filter element with high friction relative to a sealing element is required.

According to a further expedient embodiment, the closure part in the mounting position is connected with form fit to the lid and/or the filter element. The form fit connection can be produced or released in a simple way and advantageously without a tool. This is done, for example, in that a central recess is introduced into the lid into which the closure part is inserted, wherein the recess has a smaller diameter than the closure part. With respect to the filter element the connection with the closure part can be preferably realized in the form of a bayonet closure wherein by means of axial movement the closure part is first approached to the filter element and subsequently the closure part is rotated about the longitudinal axis of the filter element until the final locking position with form fit between the closure part and the filter element is reached. For realizing the bayonet closure, on the closure part at least one locking web can be arranged that engages in a mounted position a correlated locking web on the filter element. The locking webs are constructively designed such that upon a rotational movement an axial approach and fast clamping action can be achieved at the same time. Incidentally, in an alternative embodiment the lid with the closure part can be connected also like a bayonet closure.

Moreover, it can be expedient to arrange on the closure part at least one locking hook which in the mounted position engages from behind a correlated locking section on the lid. Accordingly, the closure part is connected with form fit to the lid in both axial directions. For releasing the closure part, it is sufficient to press the bendable locking hook into the disengaged position and at the same time remove the closure part axially from the lid.

A component of the annular filter element is expediently a central or support tube that is introduced, for improvement of the stability, into the filter element and forms the wall of the cylindrical interior of the filter element. According to a preferred embodiment, the closure part is connected to the central tube that for this purpose has corresponding locking elements that are embodied so as to correspond with the locking elements on the closure part. In the mounted position, the lid is seated immediately on the end face of the central tube.

In general, both end faces of the filter element are covered by terminal disks which are also a component of the filter element. Optionally, the connection between filter element and closure part is realized by one of the terminal disks that is provided for this purpose with locking elements. It may also be expedient to provide at least one terminal disk and the central tube in monolithic embodiment and to realize the locking action with the closure part either with the terminal disk or the central tube.

According to a further expedient embodiment, it is provided that on the lid a cylindrical collar is provided that surrounds the central recess that is introduced into the lid and that extends axially in the form of a socket. The collar projects in the mounted position into the central tube and facilitates positional fixation of the lid in relation to the filter element. It can be expedient to provide a rib or the like on the collar as a mounting aid which engages a correlated groove on the inner wall of the central tube. In this way, the rotational position of the lid relative to the filter element is positively determined.

According to a further advantageous embodiment, it is provided that the lid is designed as a closed disk and, on the inner side of the lid that is facing the filter element, form fit elements are arranged for connecting with the closure part. As in the embodiment with central recess in the lid, the form fit elements can be designed as locking webs which upon relative rotational movement assume a locking position relative to each other so that the components in axial direction are secured with form fit and safely on each other. In the embodiment of the lid without central recess, the form fit elements at the lid are expediently provided on the inner side of a collar that projects in axial direction past the inner side of the lid and correspond with form fit elements on the exterior side of a ring of the closure part.

It can be expedient to provide on the closure part a snap hook for limiting the relative rotational movement between lid and closure part so that with engagement of the form fit elements across a limited angle segment a relative rotational movement between lid and closure part is possible. This relative rotational movement can be used for locking or unlocking the component, comprised of the lid and the closure part, on the filter element or the central tube of the filter element. At the same time, the snap hook prevents an accidental unintentional detachment of the closure part from the lid. Inasmuch as a detachment of the closure part from the lid is desired, the snap hook can be force-loaded into its opening positions so that the form fit elements on the closure part and on the lid can be disengaged from each other.

Moreover, it can be expedient to provide on the lid and on the filter element or a component connected to the filter element, in particular the central tube, axially oriented positioning elements that are serving for securing the relative rotational position between the lid and the filter element. The axially oriented positioning elements engage each other upon axial placement of the lid onto the filter element or the central tube so that the relative rotational position is determined positively. A plurality of such positioning elements can be distributed about the circumference, respectively, and can be designed, for example, as recess or ribs, wherein the number of positioning elements enables a corresponding number of rotational positions between lid and filter element or central tube.

For an easier actuation and manipulation of the closure part, the latter can be provided with a central actuating grip. In particular in the closed embodiment of the lid without a central recess, the actuating grip is curved and projects in the mounted state of the filter device into the interior of the filter element in order to facilitate engagement and actuation, in particular rotation of the closure element.

BRIEF DESCRIPTION OF THE DRAWINGS

Further advantages and expedient embodiments can be taken from the further claims, the figure description, and the drawings. It is shown in:

FIG. 20 a section view of the filter device;

FIG. 21 the sectioned filter device in a perspective view from above.

In the Figures, the same components are identified with the same reference characters.

DETAILED DESCRIPTION OF THE INVENTION

Figure 1:
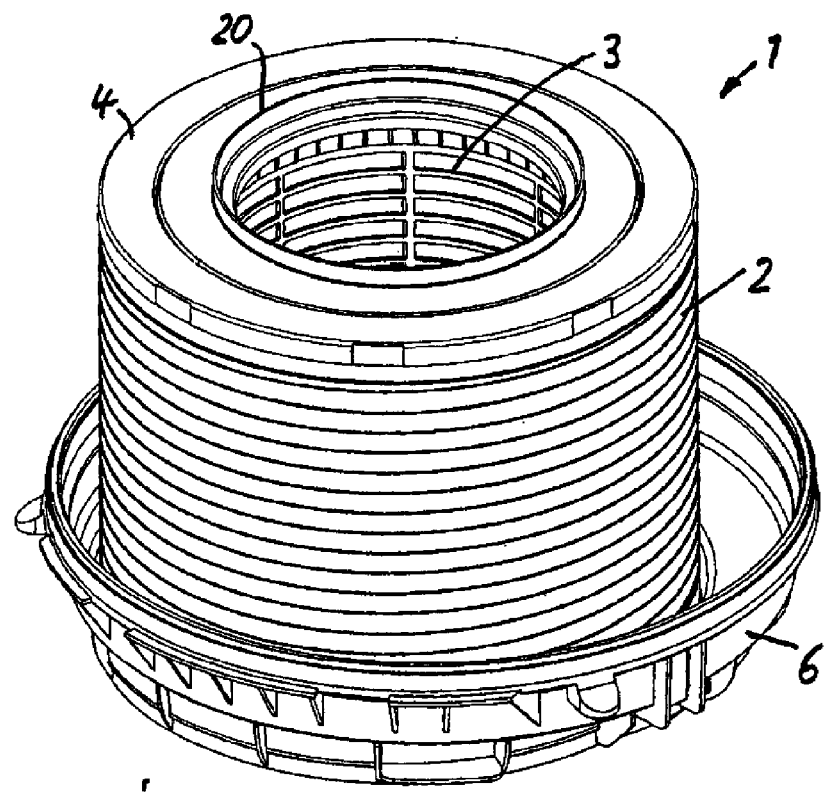
FIG. 1 a perspective view of a filter device with an annular filter element that in the area of an end face is closed by a lid which is a component of a filter housing.
Figure 2:
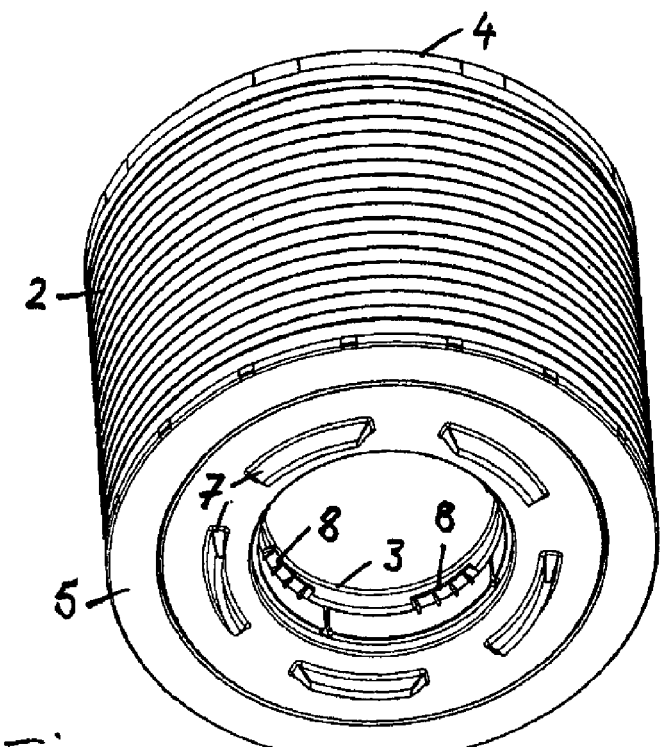
FIG. 2 the filter element, shown by itself, with a view of the end face where the lid is to be arranged.

As can be seen in FIGS. 1 and 2, the filter device 1 has an annular filter element 2 whose end faces each are sealed off by terminal disks 4 and 5, respectively. In the filter element 2 a plastic central tube 3 as a support frame is integrated that forms at the same time the inner wall of the interior of the filter element 2. The filter element 2 is flowed through radially from the exterior to the interior by the fluid to be purified that subsequently is discharged in purified form out of the interior in axial direction.

A lid 6 belongs to the filter housing and is to be connected to an end face of the filter element 2.

As can be seen in FIG. 2, on the terminal disk 5 which is facing in the mounted state the lid 6, axially projecting support webs 7 that serve for supporting the lid 6 are provided. Moreover, FIG. 2 shows that in the central tube 3, on the side which is neighboring the terminal disk 5, locking webs 8 extending in circumferential direction are arranged at a minimal axial spacing to the end face and are located on the inner side of the central tube 3 and are monolithically formed therewith. Distributed about the circumference, several such locking webs 8 are provided that each extend across a limited angular segment and preferably all have the same axial spacing to the end face. The locking webs 8 serve for providing a form fit locking action in the manner of a bayonet closure with a closure part that is illustrated in FIGS. 5 and 6.

Figure 3:
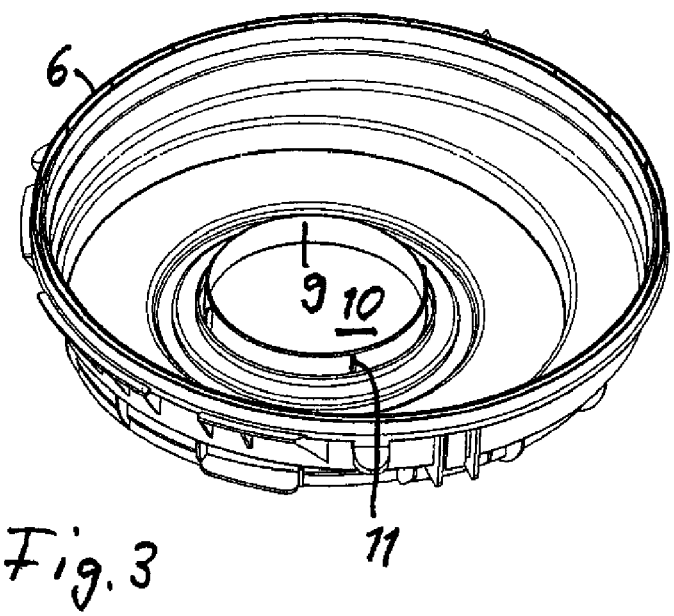
FIG. 3 the lid in perspective illustration.
Figure 4:
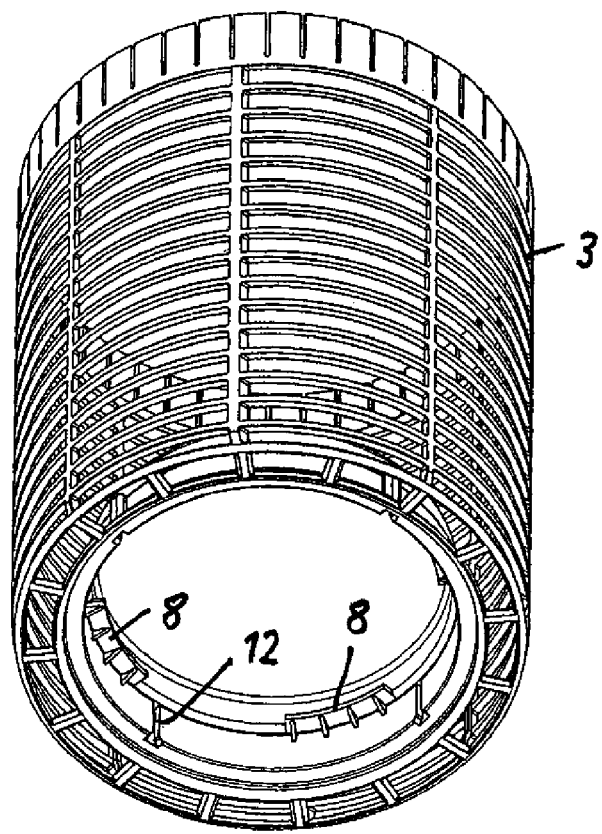
FIG. 4 a central tube which is inserted into the filter element, shown by itself.

As can be seen in the view of the lid 6 according to FIG. 3, a central recess 10 is incorporated into the lid 6 and is delimited by an axially projecting socket-shaped collar 9. On the exterior side of the collar 9 there are, regularly spaced, axially extending ribs 11 which are monolithically formed with the collar 9 and serve as a mounting aid. In the mounted state the ribs 11 project into correlated grooves 12 which, as can be seen in FIG. 4, are introduced on the inner side into the central tube 3 adjacent to the end face of the central tube. By means of engagement of the ribs 11 in the grooves 12 a precise orientation of the lid in the rotation direction is provided.

Figure 5:
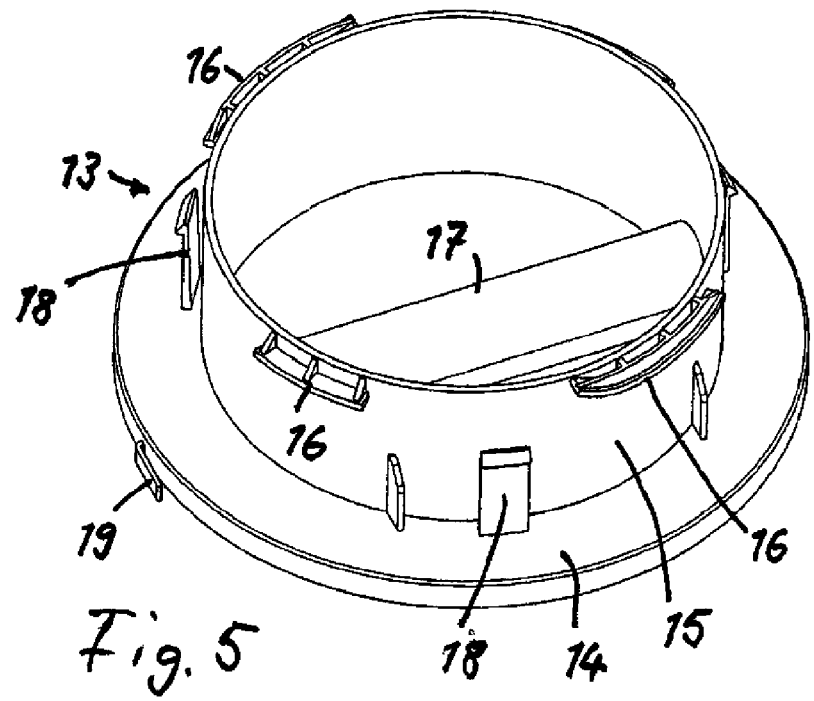
FIG. 5 a closure part by means of which the lid is connected with the central tube of the filter element, illustrated in perspective view.
Figure 6:
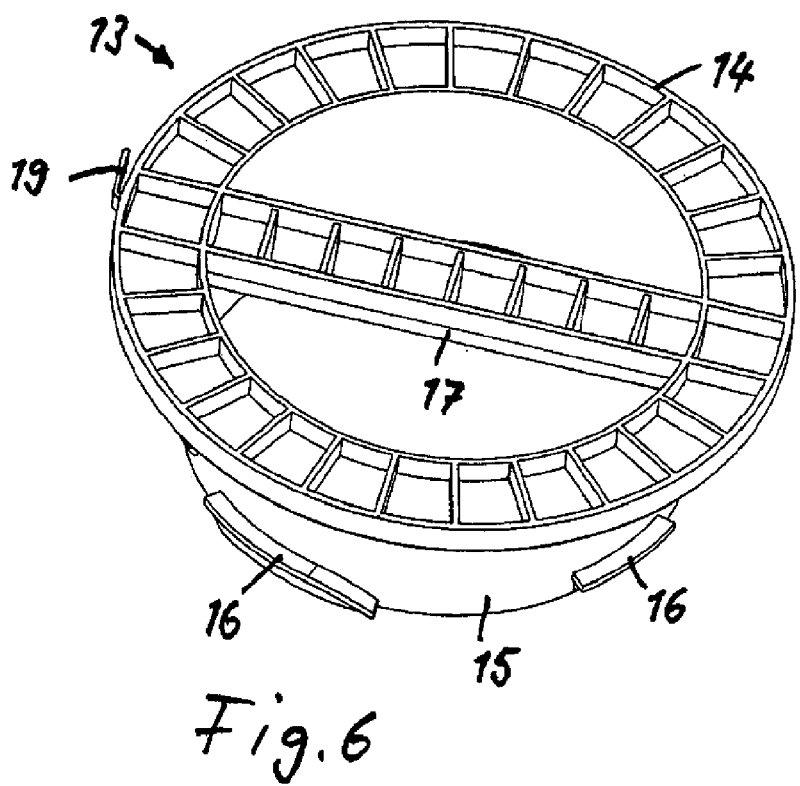
FIG. 6 the closure part in a further illustration.

FIGS. 5 and 6 show a closure part 13 in two different perspective illustrations. The closure part 13 serves as a connecting element for connecting the lid 6 with the filter element 2 or the central tube 3 in the filter element. The closure part 13 has a radially expanded collar 14 and an axially projecting collar 15 that has, relative to the collar 14, a smaller diameter. The collar 15 supports locking webs 16 that are distributed about the circumference adjacent to the free end face on the exterior side of the collar. The locking webs 16 interact in the mounted position with the locking webs 8 on the inner wall of the central tube 3 in the manner of a bayonet closure. A portion of the locking webs 16 on the closure part 13 has a curved section that upon rotational movement of the closure part 13 about the axis of the filter device facilitates pushing onto the correlated locking webs 8 on the central tube 3. The closure part 13 is also provided with an actuating grip 17 which spans the central recess in the sleeve-shaped closure part 13 and is designed to facilitate easier handling of the closure part.

The collar 14 has a greater diameter than the central recess 10 of the lid 6 so that, upon insertion of the closure part 13 into the recess 10 of the lid 6, the lid and the closure part are connected to each other with form fit in axial direction.

On the collar 14 several locking hooks 18 are distributed about the circumference and extend each in axial direction and are arranged at a minimal radial spacing relative to the outer wall of the collar 15. The locking hooks 18 serve for clamping fast a correlated locking section on the lid 6 wherein the locking section is preferably the collar 9 on the lid 6. Accordingly, it is possible, by axial insertion of the collar 15 into the central recess 10 in the lid 6, and by the locking action of the locking hooks 18 on the end face of the collar 9 on the lid 6, to secure with from fit the two components in opposite axial directions. For release of the connection, the locking hooks 18 must be bent slightly in the direction toward the collar 15 on the closure part 13 until the locking hooks become disengaged from the collar 9 on the lid 6 and the closure part can be removed again in axial direction from the central recess 10 in the lid 6.

As can be seen further in FIGS. 5 and 6, on the outer circumference of the collar 14 of the closure part 13, a looking hook 19 is arranged which upon mounting delimits the rotational movement of the closure part 13. The locking hook 19 upon rotational movement contacts a correlated locking member on the lid 6.

Figure 7:
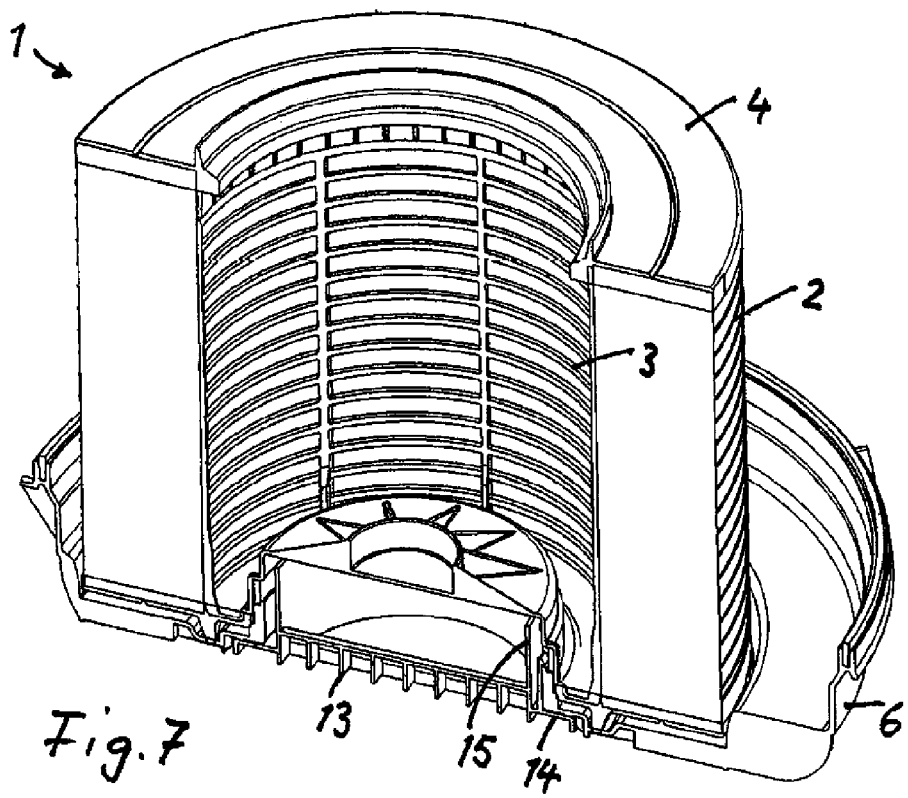
FIG. 7 a section through the filter element with the lid, including closure part, attached at the end face, shown in perspective illustration.
Figure 8:
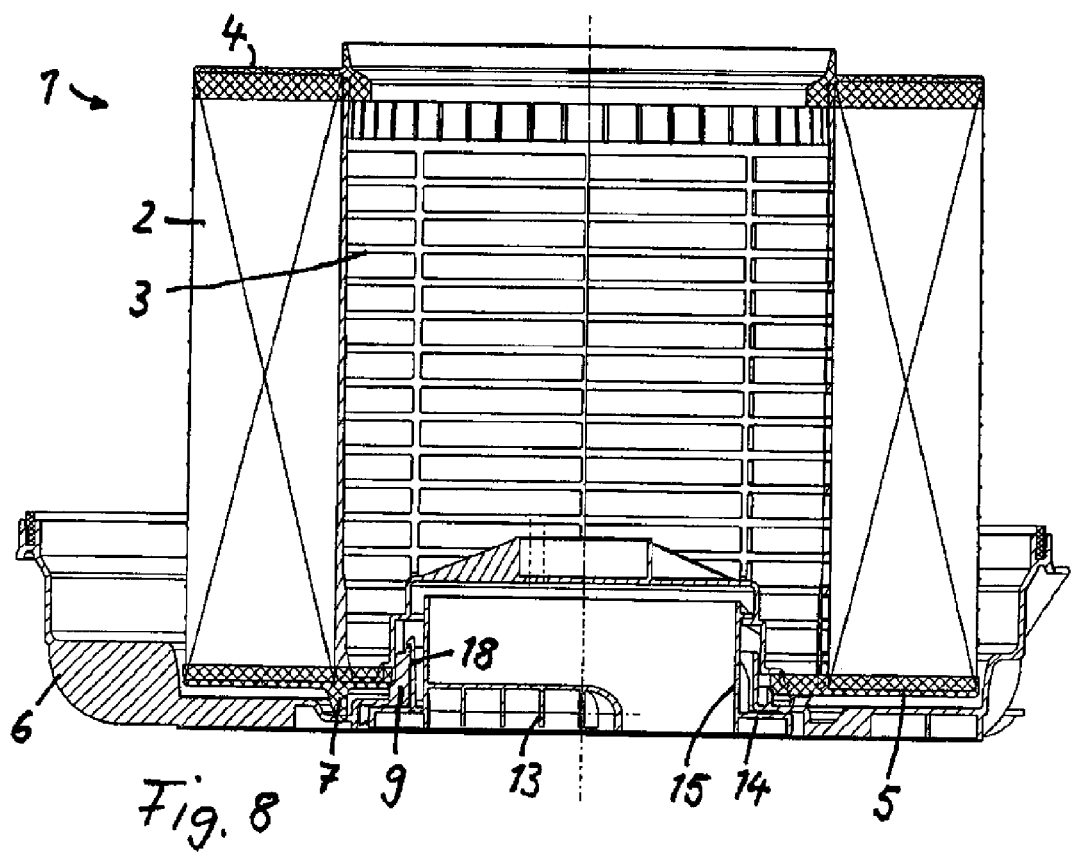
FIG. 8 a further section illustration through the filter device.
Figure 9:
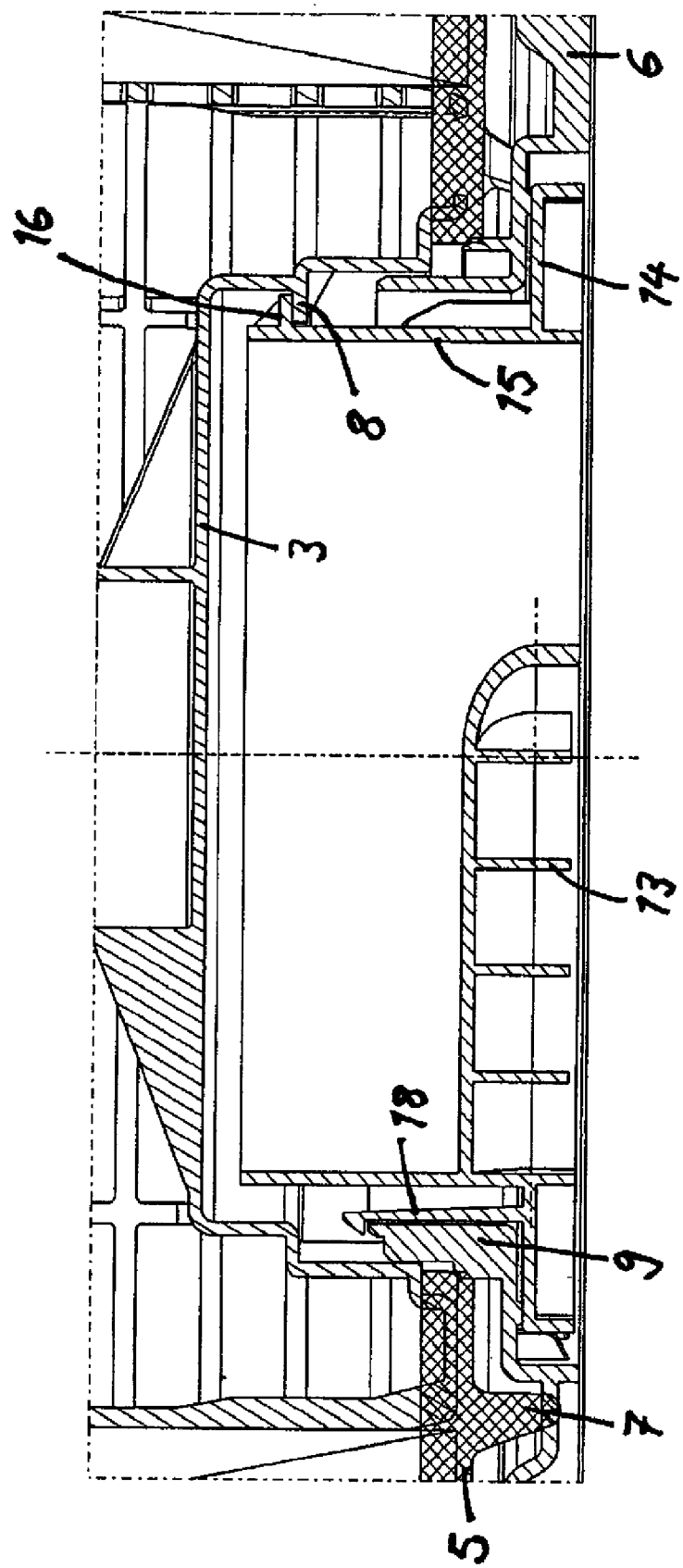
FIG. 9 the connecting area with central tube, closure part, and lid in enlarged illustration.

In FIGS. 7 to 9, section illustrations of the filter device 1 with the filter element 2 and the lid 6 mounted with the aid of the closure part 13 are illustrated. In the central recess in the lid 6 the closure part 13 is inserted wherein the radially extended collar 14 of the closure part 13, as a result of its diameter being greater than the central recess, securely holds the lid 6 of the filter element 2. The collar 15 of the closure part 13 engages with the locking webs 16 the correlated locking webs 8 on the central tube 3 (FIG. 9). Accordingly, the closure part 13 together with the lid 6 is securely held with form fit in axial direction on the central tube 3 and thus on the filter element 2.

As can be seen in FIGS. 8 and 9, the locking hooks 18 which are monolithically formed on the closure part 13 are in the locking position in which the locking hook 18 engages from behind the end face edge of the collar 9 on the lid 6.

The support webs 7 which are monolithically formed with the terminal disk 5 on the filter element 2 are positioned in mounted position so as to contact the inner side of the lid 6. The support webs 7 are located radially outside of the closure part 13 and effect an additional stabilization of the lid 6.

Figure 10:
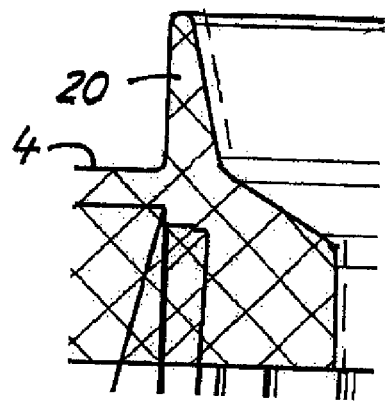
FIG. 10 a detail view of the area of the upper terminal disk with integrally formed sealing lip.
Figure 11:
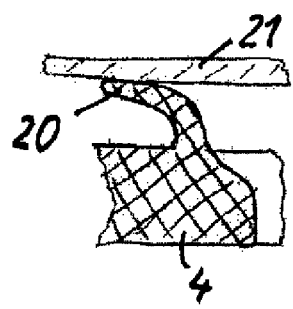
FIG. 11 the upper terminal disk in mounted position.

As can be seen in FIGS. 10 and 11, monolithically with the upper terminal disk 4 a sealing lip 20 is formed which projects axially past the topside of the terminal disk 4 and is of an annular configuration. The sealing lip 20 which is arranged on the radial inner side of the annular terminal disk 4 is also shown in FIG. 1. In the mounted position, the sealing lip 20 is seal-tightly resting on a housing component 21 of the filter device, for example, on the bottom of the cup-shaped part of the housing, as can be seen in FIG. 11. The sealing lip 20 is designed to be elastically deformable and upon assembly is pressed against the housing component 21 and is thereby deformed. The force which is generated by the deformation and which is based on the inherent elasticity of the sealing lip serves as a sealing force with which the sealing lip 20 presses against the housing part 21.

It may be expedient to provide on each of the two terminal disk such sealing lips.

The terminal disk 4 and the sealing lip 20 which is formed monolithically with the terminal disk are comprised, for example, of polyurethane (PUR) or of another material that has a defined elasticity for elastic deformation of the sealing lip.

FIGS. 12 to 21 show a further embodiment of a filter device which is designed similarly to the preceding embodiment but differs in particular in regard to the lid and the closure element.

Figure 12:
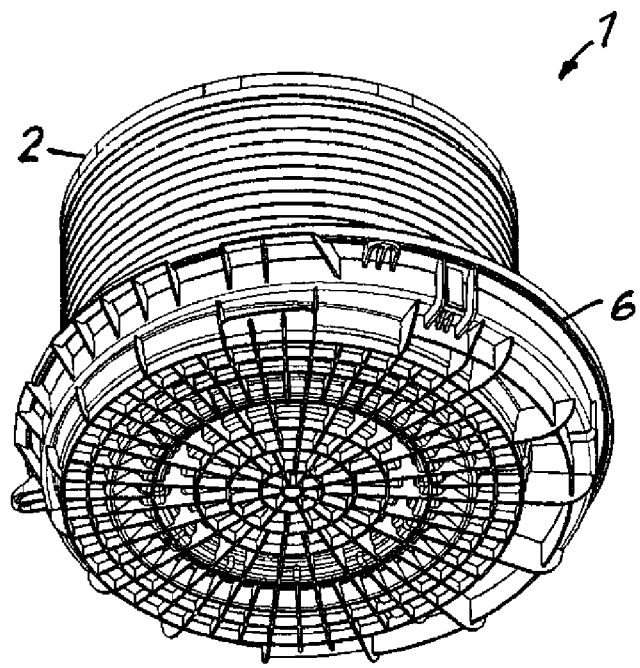
FIG. 12 a perspective view of the filter device in a further embodiment, illustrated with end face lid element.

As can be seen in FIG. 12, the annular filter element 2 of the filter device 1 is closed off at the end face by the lid 6 which, in contrast to the first embodiment, has no central recess but is configured as a closed disk. As can be seen in the perspective view of the lid 6 according to FIG. 13, on the inner side of the lid an annular collar 9 projects in axial direction and has on its end face several ribs 22 distributed about the circumference and projecting in axial direction and forming positioning elements for securing the rotational position of the lid relative to the filter element. The ribs 22 correspond with correlated positioning elements in the form of recesses 23 (FIG. 17) which are introduced adjacent to the lower end face into the central tube 3. Distributed about the circumference there are a total of six ribs 22 or recesses 23 with uniform spacing so that positioning of the lid on the central tube is possible in six different rotational positions at a respective angular distance of 60 degrees relative to each other.

The radial outer surface of the collar 9 forms a sealing surface on which the lower terminal disk which closes off the filter element is resting seal-tightly.

On the radial inner side of the collar 9, uniformly distributed about the circumference, a total of four webs 24 extending in circumferential direction are arranged that constitute form fit elements for a form fit connection with the closure part.

Figure 13:
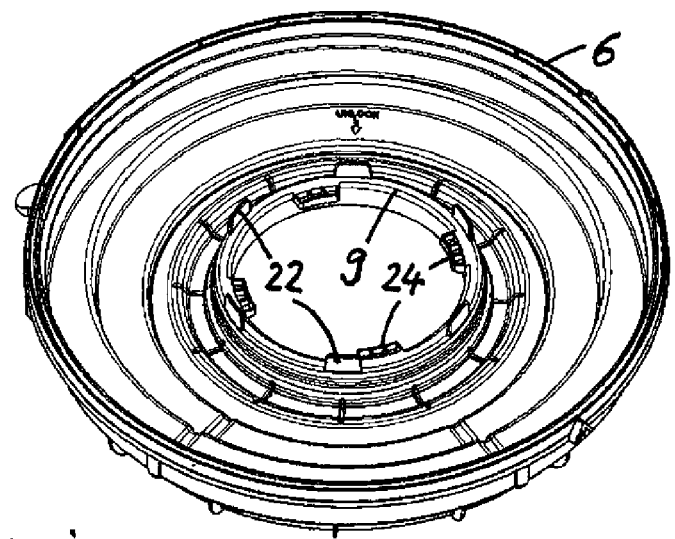
FIG. 13 the lid element in a perspective individual illustration.
Figure 14:
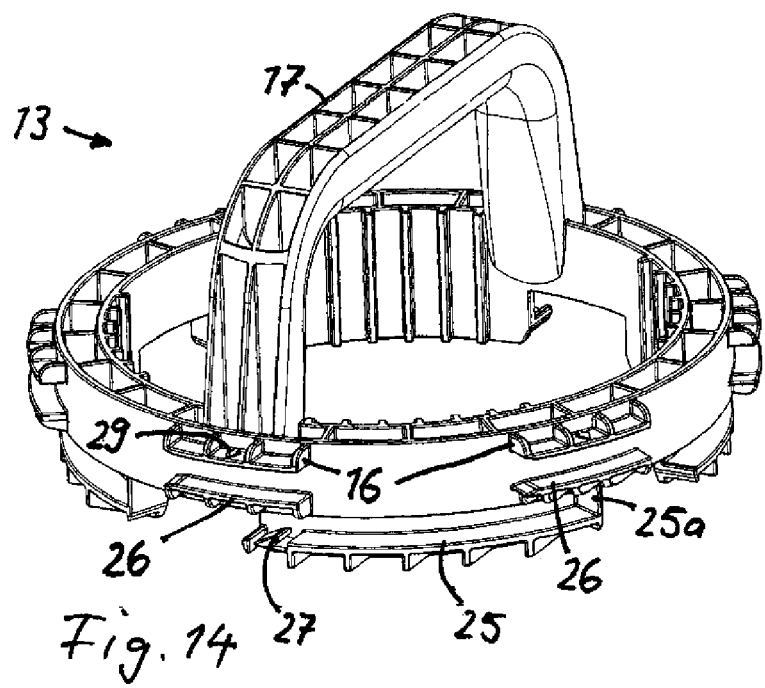
FIG. 14 a closure part in individual illustration which is to be connected to the lid part according to FIG. 13.
Figure 15:
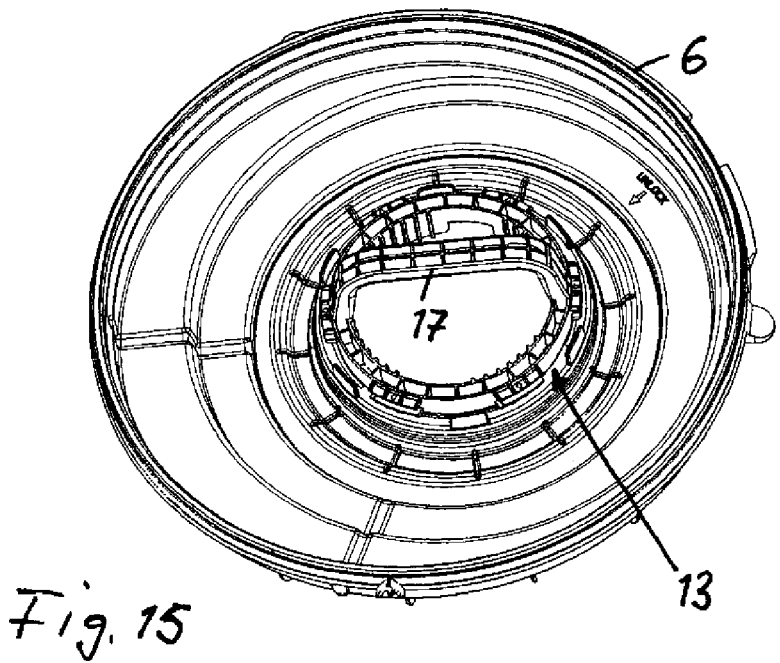
FIG. 15 lid and closure part in connected position.

In FIG. 14 the closure part is illustrated in an individual illustration, FIG. 15 shows the connection of the lid 6 and closure part 13. The closure part 13 is annularly designed and has a bracket-shaped web 17 which in the mounted state projects past the inner side of the lid 6 and facilitates engagement and rotation of the closure part. On the radial outer surface of the ring of the closure part 13 there are webs 25 and 26 which constitute form fit elements for form fit connection with the lid 6. The webs 25 and 26 correspond with the webs 24 on the inner side of the collar 9 on the lid 6 (FIG. 13). On an end face of the web 25 there is a snap hook 27 which forms together with the web 26, positioned above and axially displaced, an insertion opening for the web 24 on the lid 6. The snap hook 27 enables insertion of the web 24 in circumferential direction into the area of the web 25 on the closure part 23 but it prevents an accidental release of the lid 6 and closure part 13 by rotation in opposite direction so that the web 24 on the lid 6 can move only up to the point of reaching the snap hook 27 that forms a stop. A second stop is provided by a wall 25a which is formed on the oppositely positioned side of the web 25. Accordingly, the relative rotational movement between closure part 13 and lid 6 is delimited by the wall 25a and the snap hooks 27. At the same time, this relative rotational movement enables transfer of the closure part 13 between a locking position on the central tube and a release position or removal position without this rotational movement also requiring a rotational movement of the lid. Instead, the lid can remain stationary during the relative rotational movement of the closure part 13 on the filter element or central tube.

Figure 17:
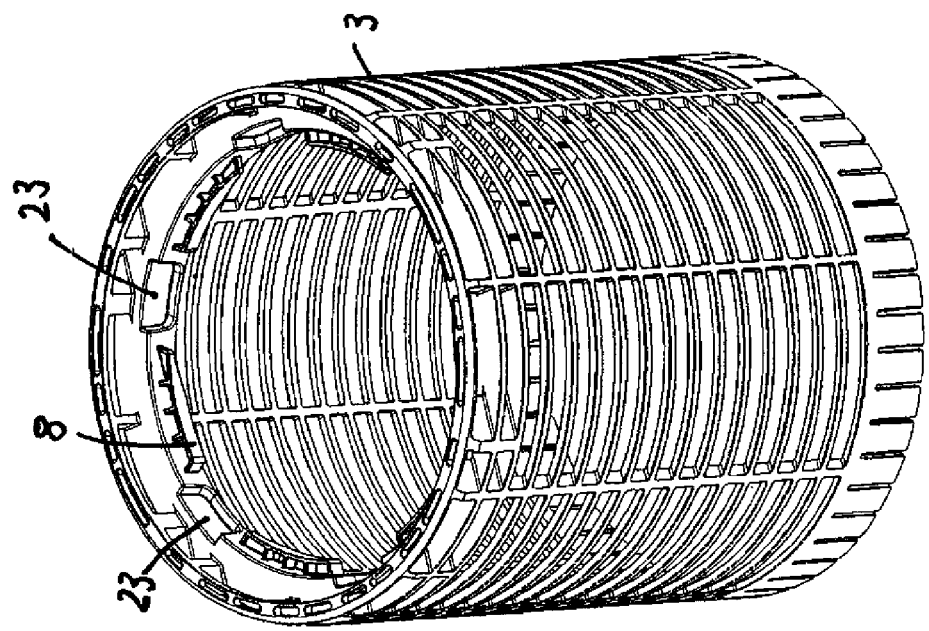
FIG. 17 the central tube in a second perspective view.
Figure 16:
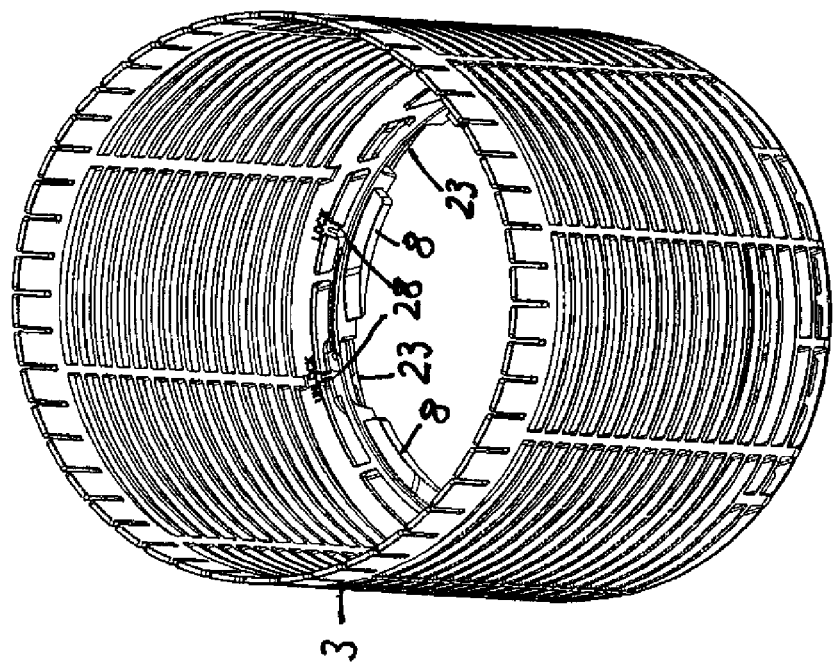
FIG. 16 the central tube of the filter element in a first perspective view.

FIG. 16 shows the central tube 3 in a perspective view from above, FIG. 17 in a perspective view from below wherein the lower side of the lid 6 is to be closed. Adjacent to the lower end face on the inner side of the central tube 3, locking webs 8 extending in the circumferential direction are distributed about the circumference. Between two locking webs each that are positioned at a spacing to each other there is a recess 23 which is embodied to be open toward the end face and which forms a positioning element that interacts with the axially projecting rib 22 on the collar 9 of the lid 6 (FIG. 13). The locking webs 8 enable together with the locking webs 16 on the closure part 13 (FIG. 14) a locking action of the closure part on the central tube 3. The locking webs 16 on the closure part 13 are located, like the webs 25 and 26, on the radial outer surface of the ring of the closure part 13. The locking webs 16 interact with the webs 26 on the outer side of the ring, the locking webs 16 and the webs 26 having the same extension in circumferential direction but the locking webs 16 displaced axially relative to the webs 26 and providing a passage for receiving the locking webs 8 on the central tube.

FIG. 16 in combination with FIG. 21 shows that on the inner side of the central tube 3 adjacent to the locking webs 8 or the recesses 23 there are markings 28 which are intended to indicate the locking or release position of the closure part 13. Markings 29 on the closure part 13 that are arranged in the locking webs 16 correspond with the markings 28 on the central tube 3. Two such markings displaced in circumferential direction on the inner side of the central tube 3 indicate a locking position and a release position, respectively. In the mounted state, the marking 29 of the closure part 13 points to the locking marking 28; for unlocking, the locking part 13 must be rotated so far that the marking 29 points to the release marking on the central tube 3.

Figure 19:
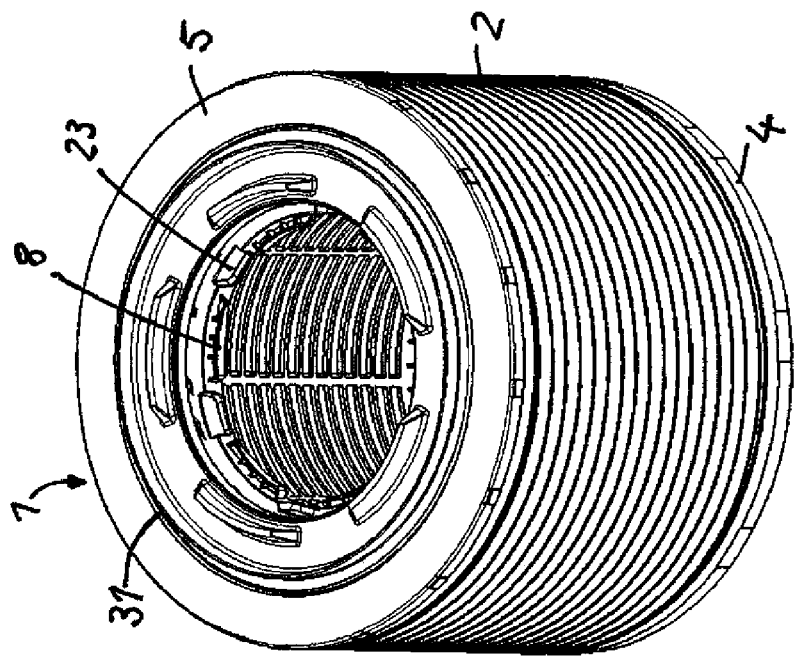
FIG. 19 the filter element with second axially oppositely positioned terminal disk in a further perspective view.
Figure 18:
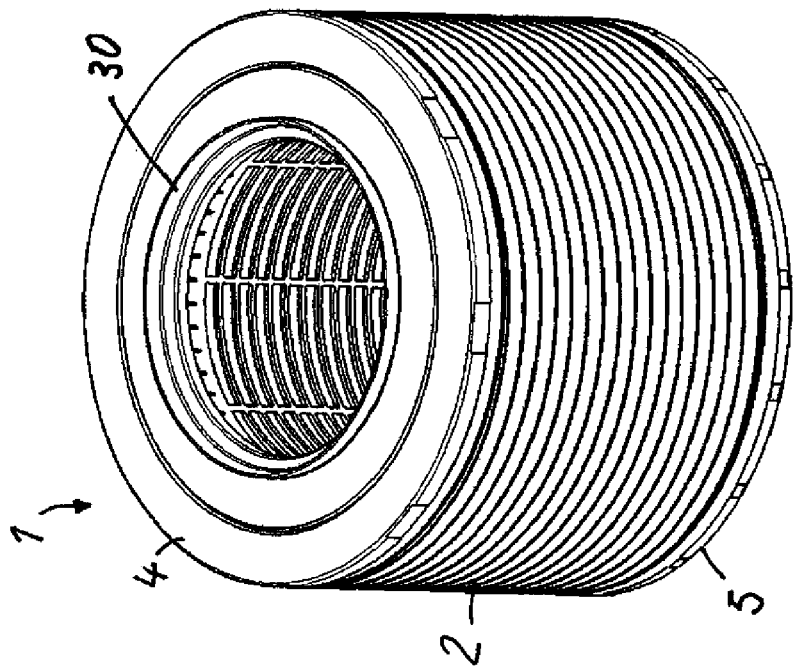
FIG. 18 the filter element with end face terminal disk in a first perspective view.

FIG. 18 shows the filter device 1 in a perspective view from above, FIG. 19 from below but without the lid being put on. The filter element 2 on both end faces is covered by a terminal disk 4 and 5, respectively, wherein on each terminal disk an annular sealing lip 30 or 31 is projecting in axial direction. The radial inner surface of the annular terminal disk 4 or 5 forms a sealing surface, respectively.

In the FIGS. 20 and 21, the filter device 1 is illustrated with mounted lid 6 as well as closure element 13. As shown in FIG. 20, the radial inner side of the terminal disk 5 forms a sealing surface and is positioned seal-tightly on a section of the lid 6 which in this area is conically shaped and connects an approximately disk-shaped, in radial direction outwardly positioned section with a circular inwardly positioned section of the lid. The sealing lip 31 on the lower terminal disk 5 contacts the inner side of the lid 6.

In FIG. 21 the closure element 6 is illustrated in the locked position in which the marking 29 on the closure element 13 is pointing directly onto the locking marking 28 on the inner side of the central tube 3. For unlocking, the closure element 13 by actuation of the actuating grip 17 must be rotated to such an extent that the marking 29 points to the second marking 28 which corresponds to the release position.

We claim:

1. A filter device comprising:
a lid configured for detachable mounting to a filter housing;
an annular filter element mounted to the lid;
a closure part embodied as a separate component from the filter element and the lid;
wherein the closure part is detachably secured to at least one of: the lid and the filter element;
axially oriented positioning elements arranged on one of: the lid, the filter element, a component connected with the filter element;
wherein the axially oriented positioning elements determine rotational position between the lid and the filter element.

2. The filter device according to claim 1, wherein
the closure part is supported rotatably in at least one of: the lid and the filter element.

3. The filter device according to claim 1, wherein
the closure part is detachably secured with form fit to at least one of: the lid and the filter element.

4. The filter device according to claim 3, wherein
the lid includes a central recess extending through the lid;
wherein the closure part is inserted into and supported rotatably in the central recess of the lid.

5. The filter device according to claim 4, wherein
the lid includes a cylindrical collar surrounding the central recess.

6. The filter device according to claim 3, wherein
the lid includes form fit elements on an inner side of the lid, the form fit elements connecting the lid with the closure part.

7. The filter device according to claim 3, wherein
the closure part is detachably secured by a bayonet closure with at least one of: the filter element and the lid.

8. The filter device according to claim 3, wherein
the closure part includes at least one locking web;
wherein the at least one locking web is arranged that in a mounted position, the at least one locking web engages behind a correlated locking web on the filter element.

9. The filter device according to claim 3, wherein
the closure part includes at least one locking hook;
wherein the at least one locking hook engages in a mounted position a correlated locking section on the lid.

10. The filter device according to claim 3, wherein
the closure part includes a snap hook;
wherein the snap hook limits relative movement between the lid and the closure part.

11. The filter device according to claim 1, comprising:
a central tube is inserted in to an interior of the annular filter element;
wherein the closure part is connected to the central tube.

12. The filter device according to claim 1, wherein
the filter element includes a terminal disk closing off an end face of the filter element;
wherein a sealing lip is formed monolithically with the terminal disk;
wherein the terminal disk with the sealing lip is comprised of polyurethane (PUR).

13. The filter device according to claim 1, wherein
a terminal disk of the filter element is resting seal-tightly on the lid;
wherein the terminal disk rests seal-tightly on the lid by any of:
 a radial inwardly positioned or outwardly positioned side of the terminal disk;
 resting axially seal-tightly on an against the lid.

14. A filter device comprising:
a lid configured for detachable mounting to a filter housing;
an annular filter element mounted to the lid;
a closure part embodied as a separate component from the filter element and the lid;
wherein the closure part is detachably secured to at least one of: the lid and the filter element;
wherein the closure part has a central actuating grip, the central actuating grip having a curved configuration;
wherein the central actuating grip projects into the interior of the filter element when the closure part is mounted to the filter element.

\* \* \* \* \*